United States Patent
Taylor et al.

(10) Patent No.: US 11,140,553 B1
(45) Date of Patent: Oct. 5, 2021

(54) THREAT DETECTION AND MITIGATION FOR REMOTE WIRELESS COMMUNICATION NETWORK CONTROL SYSTEMS

(71) Applicant: MOTOROLA SOLUTIONS, INC., Chicago, IL (US)

(72) Inventors: Sean M. Taylor, Hinsdale, IL (US); Edwin Alicea, Chicago, IL (US); Michael F. Korus, Eden Prairie, MN (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/880,820

(22) Filed: May 21, 2020

(51) Int. Cl.
*H04W 12/122* (2021.01)
*H04W 12/00* (2021.01)

(52) U.S. Cl.
CPC ....... *H04W 12/122* (2021.01); *H04W 12/009* (2019.01)

(58) Field of Classification Search
CPC .......................... H04W 12/122; H04W 12/009
See application file for complete search history.

(56) References Cited

U.S. PATENT DOCUMENTS

| | | | |
|---|---|---|---|
| 9,336,060 B2 | 5/2016 | Nori et al. | |
| 10,204,226 B2 * | 2/2019 | Bushey | G06N 20/10 |
| 2004/0255167 A1 * | 12/2004 | Knight | H04L 63/20 726/24 |
| 2005/0015624 A1 * | 1/2005 | Ginter | H04L 63/20 726/4 |
| 2007/0039047 A1 * | 2/2007 | Chen | H04L 63/20 726/22 |

(Continued)

FOREIGN PATENT DOCUMENTS

EP 3178216 B1 4/2020

OTHER PUBLICATIONS

Yang et al., Efficient Intrusion Detection System Model in Wireless Mesh Network, Apr. 2010, Second International Conference on Networks Security, Wireless Communications and Trusted Computing, pp. 393-396 (Year: 2010).*

(Continued)

*Primary Examiner* — Kenneth W Chang
(74) *Attorney, Agent, or Firm* — Michael Best & Friedrich LLP (57) ABSTRACT

Systems and methods for threat detection and mitigation for remote wireless communication network control systems. One example method includes receiving a threat detection message identifying a threat to at least one of a plurality of remote wireless network controllers, each associated with one of a plurality of wireless communication networks. The method includes determining a threat rating based on the threat detection message and determining, based on the rating, a threat mitigation action identifying at least a first remote wireless network controller of the plurality of remote wireless network controllers. The method includes executing the threat mitigation action by commanding a shift in an operational function of the first remote wireless network controller to a first on-premise wireless network controller associated with the same wireless communication network as the first remote wireless network controller.

20 Claims, 3 Drawing Sheets

(56) References Cited

U.S. PATENT DOCUMENTS

| | | | |
|---|---|---|---|
| 2008/0271135 A1* | 10/2008 | Kreil | H04L 69/40 726/14 |
| 2016/0028759 A1* | 1/2016 | Visbal | H04L 63/14 726/22 |
| 2016/0088475 A1 | 3/2016 | Zhang | |
| 2018/0084389 A1 | 3/2018 | Snyder et al. | |
| 2019/0132230 A1* | 5/2019 | Chandrasekaran | H04L 47/28 |

OTHER PUBLICATIONS

Zhang et al., Distributed Intrusion Detection System in a Multi-Layer Network Architecture of Smart Grids, Dec. 2011, IEEE Transactions on Smart Grid, vol. 2, No. 4, pp. 796-808 (Year: 2011).*

International Search Report and Written Opinion for Application No. PCT/US2021/031812 dated Aug. 9, 2021 (13 pages).

\* cited by examiner

THREAT DETECTION AND MITIGATION FOR REMOTE WIRELESS COMMUNICATION NETWORK CONTROL SYSTEMS

BACKGROUND OF THE INVENTION

Public safety and other organizations use wireless networks and portable electronic devices to facilitate communication among their members. For example, members may use portable two-way radios, smart telephones, and converged devices operating over land mobile radio (LMR) networks, long-term evolution (LTE) networks, or other wireless communication systems that provide voice, broadband, and other capabilities. Some wireless networks provide multiple modes of communication among groups of hundreds or even thousands of devices. Such networks utilize computer-based controllers to provision access, organize talk groups, set up and maintain calls, transmit data streams, and track performance of the networks. To provide redundancy and other benefits, some networks utilize multi-tenant cloud computing environments and other shared computing environments to house network control functions remotely.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted above, some wireless communication networks utilize multi-tenant cloud computing environments to house network control functions remotely. Some platforms may house the network controllers for multiple separate wireless communication networks. Individual wireless communication networks are subject to threats, for example, denial of service attacks, compromised security tokens, vulnerability attacks, crypto jacking, and the like. Such threats can lead to degraded network performance or, in some cases, disable the affected networks. However, some threats may result in an individual network controller consuming significant resources of the cloud computing environment, indirectly affecting other tenants (for example, other network controllers) on the same platform. Other threats may affect all tenants of the cloud computing environment directly. Such threats may lead to cascading communication failures across many or all of the tenants' wireless communication networks. Accordingly, systems and methods are provided herein for threat detection and mitigation in remote wireless communication network control systems.

Embodiments described herein provide, among other things, a cloud "safety hatch" mechanism, which utilizes rule-based threat detection in concert with redundant on-premise network controllers to temporarily transfer control of one or more wireless networks away from cloud-based network controllers. For example, in some embodiments, when the safety hatch is triggered, a wireless network's operational data (for example, mobility information, provisioning data, current active call data, system fault and performance data, active integrated voice and data (IVD) data sessions, and the like) is transferred to an on-premise single tenant environment for that network. In such embodiments, the transferred operational data is used by an on-premise (that is, local) network controller to process call and data traffic locally, and to monitor critical network management services to the on-premise environment. When the threat that triggered the transfer is mitigated, the safety hatch is opened, and the network's operational data is re-synced from the on-premise network controller to the multi-tenant cloud environment, shifting control of the wireless network back to the cloud-based network controller.

Among other things, using such embodiments, the safety hatch transfers operational data for all network control systems in the cloud computing environment to their respective on-premise controllers. Some embodiments address threats that may result in an impact to only a subset of the cloud-based network controllers. In such embodiments, a more granular approach to transferring control to on-premise network controllers may be used, such that only the impacted systems are transferred. In addition, some embodiments address threats where only a subset of functionality is compromised (e.g., voice services), migrating only that functionality to on-premise network controllers, while the remaining system functionality is controlled by the cloud-based network controllers. In cases of a severe threat (for example, a compromised super user), embodiments of the safety hatch mechanism migrate control and promptly clear the cloud-based platform's database and all user data to minimize the impact of the threat and reduce exposure of the data.

Among other things, using such embodiments, the impact of threats on wireless communication network controllers is reduced. This reduced impact, in turn, leads to improved operation of the wireless networks, more reliable communications, and more efficient use of the networks and their respective computing resources.

One example embodiment provides a wireless communication system. The wireless communication system includes a safety hatch controller, which includes a transceiver and an electronic processor. The safety hatch controller is communicatively coupled to a plurality of remote wireless network controllers and a plurality of on-premise wireless network controllers. Each of the plurality of remote wireless network controllers is associated with one of a plurality of wireless communication networks, and each of the plurality of on-premise wireless network controllers is associated with one of the plurality of wireless communication networks. The electronic processor is configured to receive, via the transceiver, a threat detection message identifying a threat to at least one of the plurality of remote wireless network controllers. The electronic processor is configured to determine, based on the threat detection message, a threat rating for the threat. The electronic processor is configured to determine a threat mitigation action based on the threat rating. The threat mitigation action identifies at least a first remote wireless network controller of the plurality of remote wireless network controllers and includes shifting an operational function of the first remote wireless network controller to a first on-premise wireless network controller of the plurality of on-premise wireless network controllers. The first remote wireless network controller and the first on-premise wireless network controller are each associated with the same wireless communication network of the plurality of wireless communication networks. The electronic processor is configured to execute the threat mitigation action.

Another example embodiment provides a method for mitigating threats to a plurality of wireless communication networks. The method includes receiving, with an electronic processor, a threat detection message identifying a threat to at least one of a plurality of remote wireless network controllers, each of the plurality of remote wireless network controllers associated with one of the plurality of wireless communication networks. The method includes determining, with an electronic processor, based on the threat detection message, a threat rating for the threat. The method includes determining a threat mitigation action based on the threat rating. The threat mitigation action identifies at least a first remote wireless network controller of the plurality of remote wireless network controllers. The method includes executing, with the electronic processor the threat mitigation action. The threat mitigation action includes commanding a shift in an operational function of the first remote wireless network controller to a first on-premise wireless network controller of a plurality of on-premise wireless network controllers. Each of the plurality of on-premise wireless network controllers is associated with one of the plurality of wireless communication networks. The first remote wireless network controller and the first on-premise wireless network controller are each associated with the same wireless communication network of the plurality of wireless communication networks.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

Figure 1:
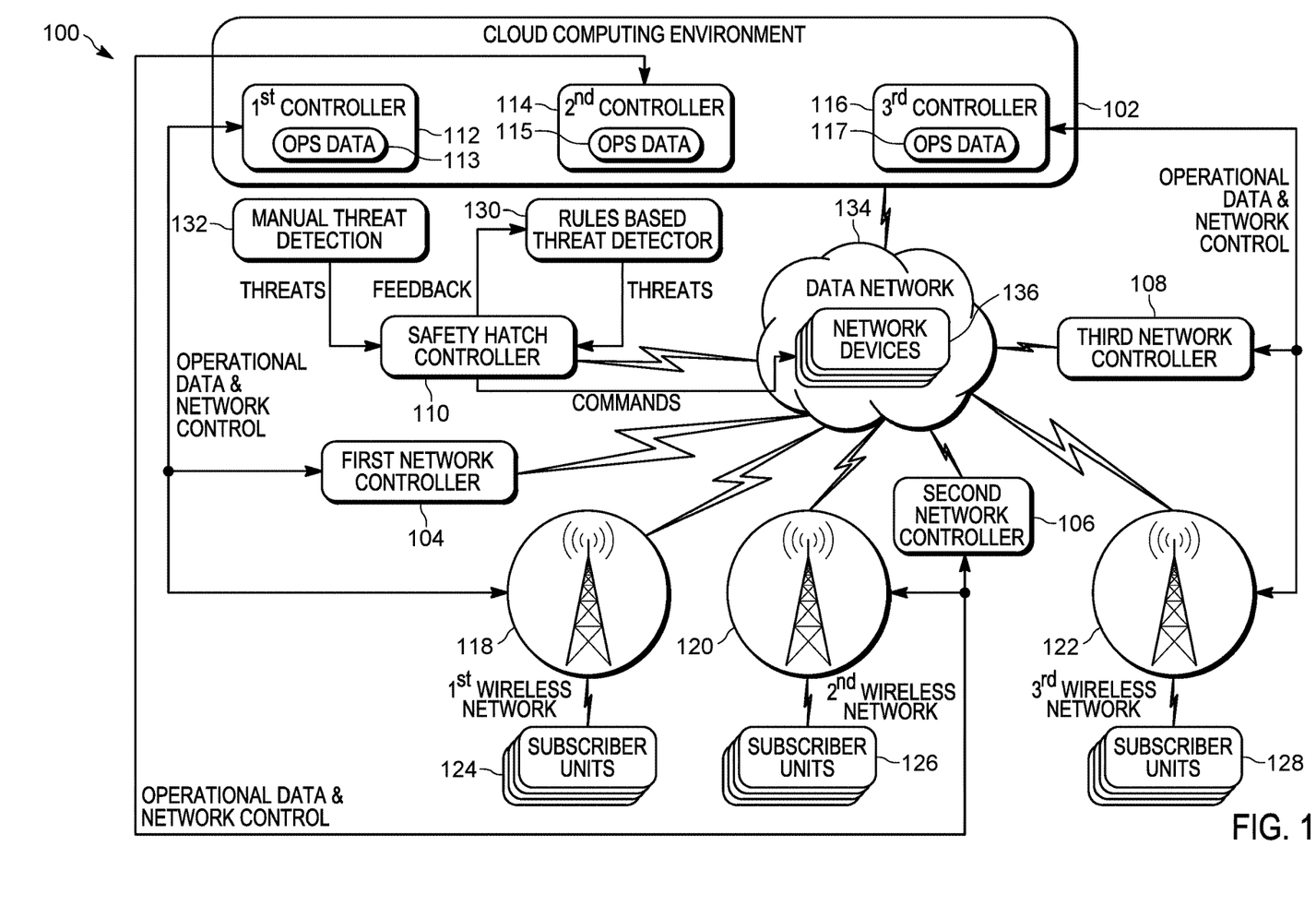
FIG. 1 illustrates a wireless communication system in accordance with some embodiments.

FIG. 1 is a block diagram of an example wireless communication system 100. FIG. 1 shows one example of a network configuration, in which embodiments may be implemented; other configurations are possible. In the example shown, the system 100 includes a cloud computing environment 102, a first on-premise network controller 104, a second on-premise network controller 106, a third on-premise network controller 108, and a safety hatch controller 110. It should be understood that the system 100 is provided as one example and, in some embodiments, the system 100 may include fewer or additional components. For example, the system 100 may include multiple cloud computing environments 102, multiple safety hatch controllers 110, fewer or greater than three on-premise network controllers, or combinations thereof. As would be understood by one skilled in the art, FIG. 1 is a simplified diagram and networks are more complex than the schematic elements depicted in FIG. 1.

The cloud computing environment 102 operates to provide applications and other computing services remotely, via one or more computing platforms. As illustrated in FIG. 1, the cloud computing environment 102 operates to provide a first remote network controller 112, a second remote network controller 114, and a third remote network controller 116. In some embodiments, each of the first remote network controller 112, the second remote network controller 114, and the third remote network controller 116 is a dedicated software environment (for example, a virtual server), which is secured from the other controllers and accessible by an authorized group of users. It should be understood that embodiments of the cloud computing environment 102 may include more than three remote network controllers. The first remote network controller 112, the second remote network controller 114, and the third remote network controller 116 are associated with a first wireless network 118, a second wireless network 120, and a third wireless network 122, respectively. The first remote network controller 112 includes software components for controlling the operation of the first wireless network 118, including operational data 113 for the first wireless network 118. The second remote network controller 114 includes software components for controlling the operation of the second wireless network 120, including operational data 115 for the second wireless network 120. The third remote network controller 116 includes software components for controlling the operation of the third wireless network 122, including operational data 117 for the third wireless network 122. Operational data (for example, mobility information, provisioning data, current active call data, system fault and performance data, active integrated voice and data (IVD) data sessions, and the like) includes the data that describes the current state of the wireless network.

Similarly, the first on-premise network controller 104, the second on-premise network controller 106, and the third on-premise network controller 108 are also associated with the first wireless network 118, the second wireless network 120, and the third wireless network 122, respectively. The first on-premise network controller 104 includes hardware and software components for controlling the operation of the first wireless network 118. The second on-premise network controller 106 includes hardware and software components for controlling the operation of the second wireless network 120. The third on-premise network controller 108 includes hardware and software components for controlling the operation of the third wireless network 122. In some embodiments, each wireless network's operational data is periodically synched from its remote network controller to the corresponding on-premise network controller.

The first wireless network 118, the second wireless network 120, and the third wireless network 122 each operate to provide land mobile radio (LMR) service, cellular service, or combinations of both to their respective subscriber units 124, 126, 128. The subscriber units 124, 126, 128 are portable communications devices, and may be, for example, mobile two-way radios, smart telephones, smart watches, vehicle modems, laptop computers, tablet computers, or other similar devices capable of operating as described herein.

LMR systems are terrestrially based, wireless communications systems commonly used by federal, state, local, tribal, and territorial emergency responders, public works companies, and even the military to support voice and low-speed data communications. Such systems typically consist of handheld portable two-way radios, mobile two-way radios, base stations, a network, and repeaters. LMR systems provide two-way radio communications, typically in the VHF, UHF, 700 MHz, and 800 MHz frequency bands, for example, implemented in accordance with the Association of Public Safety Communications Officials (APCO) "Project 25" (P25) two-way radio communications protocol. In some embodiments, the wireless networks may operate according to the TETRA standard defined by the European Telecommunication Standards Institute (ETSI), the Digital Private Mobile Radio (dPMR) standard also defined by the ETSI, the Digital Mobile Radio (DMR) standard also defined by the ETSI, among other possibilities, and over which multimedia broadcast multicast services (MBMS), single site point-to-multipoint (SC-PTM) services, or Mission Critical Push-to-talk (MCPTT) services may be provided. Cellular networks may operate according to an industry standard cellular protocol such as, for example, the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which, among other things, an open mobile alliance (OMA) push to talk (PTT) over cellular (OMA-PoC), a voice over IP (VoIP), or a PTT over IP (PoIP) application may be implemented.

The first wireless network 118, the second wireless network 120, and the third wireless network 122 may be controlled by their respective remote network controllers, their respective on-premise network controllers, or combinations of both. As used herein, the terms "remote network controller" and "remote wireless network controller" refer to network controllers implemented remotely from their respective wireless networks, and accessible by the wireless networks via one or more data networks. As used herein, the terms "on-premise network controller" and "on-premise wireless network controller" refer to network controllers co-located with or deployed in proximity to their respective wireless networks. For example, an on-premise network controller may be co-located with a base station of its associated wireless network. In some embodiments, an on-premise network controller may refer to network controllers that, while not on the actual premises of the wireless network, are still separate from the remote network controllers in the cloud computing environment. For example, an on-premise network controller may be housed in a data center, a disaster recovery facility, a second cloud computing environment, or another suitable location accessible by its associated wireless network over one or more data networks.

Figure 2:
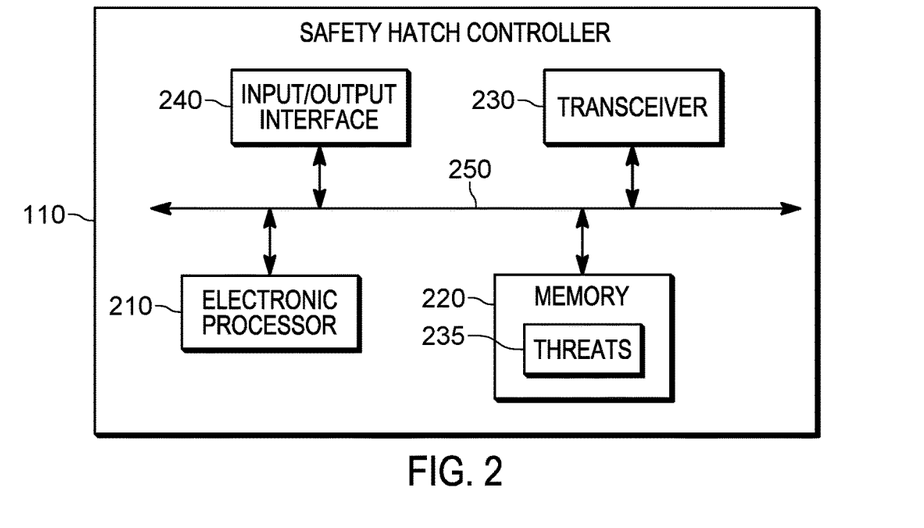
FIG. 2 schematically illustrates a safety hatch controller in accordance with some embodiments.

The safety hatch controller 110, described more particularly herein with respect to FIG. 2, receives threat information (for example, from a rules-based threat detector 130 or from a manual threat detection system 132) regarding the cloud computing environment 102, the first remote network controller 112, the second remote network controller 114, and the third remote network controller 116, and takes appropriate mitigation actions. For example, the safety hatch controller 110 is configured to transfer control of the first wireless network 118, the second wireless network 120, and the third wireless network 122 between their respective remote and on-premise network controllers based on threat conditions. In some embodiments, the safety hatch controller 110 makes determinations regarding the reported threats, and sends feedback based on the determinations to the rules-based threat detector 130.

As used herein, the term "threat" means an attack on or vulnerability in the wireless networks, their respective remote network controllers, or the cloud computing environment itself. One type of threat is a high rate denial of service (DoS) attack. For example, a bot (for example, on a compromised subscriber unit) on one wireless network may generate a call request flood attack that consumes significant cloud computing resources, resulting in the denial of legitimate PTT requests. Such threats may deny service for all tenants of the cloud computing environment. A high rate DoS attack may be detected through an abnormal call request load (as compared to, for example, historic call request data).

Another type of threat is a slow rate or targeted DoS attack. For example, a compromised (stolen) API access token may be obtained and used by an attacker to modify subscriber unit location registration (i.e., site affiliations) or talkgroup affiliations. Slow rate DoS attacks result in a user or a set of users missing calls (thus being denied service). Such threats are typically limited to single tenant of the cloud computing environment because access tokens are scoped to a tenant. Slow rate DoS attacks may be detected through unusual endpoint behavior (for example, a subscriber unit jumping sites).

Another type of threat is a compromised account, in particular, an account with administrative rights. For example, an attacker may gain access to a cloud administrator account through a phishing campaign or by other means, giving the attacker administrator access to system configurations, including security controls. Such threats may result in system data being downloaded (exfiltrated) and shared on the public internet (e.g., live stream of device location or steaming of clear voice calls). Such threats are typically limited to single tenant of the cloud computing environment. Compromised account threats may be detected through unusual user account activity (for example, one account logged into multiple systems simultaneously; multiple accounts logged into the same machine simultaneously; accounts logged in at odd times or outside of ordinary business hours; and the like).

Another type of threat is a vulnerability attack. Vulnerabilities may be caused, for example, by a misconfigured server or a zero-day attack. For example, a Server Side Request Forgery (SSRF) attack may be used to trick a legitimate server instance into running commands on behalf of the attacker (that the server would otherwise not have been permitted to run). Such attacks are generally against the Instance Metadata API and are a result of misconfigured servers, which may occur in complicated deployments. Such attacks may result in data exfiltration and/or data corruption (e.g., if access to device location, talkgroup affiliation, encryption key storage, or call state is compromised). Such threats may impact all tenants of the cloud computing environment. Vulnerabilities may be detected by unusual inter-server communications or by monitoring access to the Instance Metadata API to look for anomalous queries (for example, as compared to historical query patterns).

Another type of threat is a theft of service. For example, hackers may leverage the highly available cloud resources in order to solve resource intensive problems (e.g. for use in cryptocurrency mining). Such threats may impact all tenants of the cloud computing environment. Theft of service threats may be detected through unusual performance loads given call volume (for example, as compared to historical performance load and call volume data).

In some embodiments, the rules-based threat detector 130 is a network-attached and accessible computer server (including, for example, an electronic processor, a memory, and an input/output interface). In some embodiments, the rules-based threat detector 130 implements an automated threat detection engine that uses various machine learning methods to analyze data to detect threats (as described herein). Machine learning generally refers to the ability of a computer program to learn without being explicitly programmed. In some embodiments, a computer program (for example, a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using these approaches, a computer program can ingest, parse, and understand data and progressively refine algorithms for data analytics.

In some embodiments, the rules-based threat detector 130 receives and stores telemetry data for the remote network controllers, the wireless networks, and the cloud computing environment. Such telemetry data includes data points representing requests received by network controllers, traces (for example, diagnostic logging), events, performance metrics, wireless network call data, subscriber unit authentication data, real time traffic data for the wireless networks, and the like. In some embodiments, the rules-based threat detector 130 receives and stores external threat intelligence (for example, reports of system vulnerabilities, attacks on other systems, and the like received from other system users or commercial services). The rules-based threat detector 130 uses machine learning to develop patterns indicative of threats. For example, analysis of network call volume over time may be used to develop a model for the expected operations of a wireless network. Call volumes that vary significantly from the model may indicate a threat. In another example, subscriber unit mobility and handoff data may be used to develop a model for the expected patterns of subscriber unit movement within a wireless network, with deviations from the expected patterns indicating a potential threat to the network.

In some embodiments, user feedback is used to train the rules-based threat detector 130. For example, when a threat is detected, it may be submitted for manual approval by a network operator. If the network operator overrides the threat determination of the rules-based threat detector 130, this override is used to adjust the model used to detect the threat.

Threats may also be reported to the safety hatch controller 110 manually. In some embodiments, the manual threat detection system 132 provides to the safety hatch controller 110 threat indications reported by users (for example, via a help desk or ticketing system) or network operators. For example, the manual threat detection system 132 may include a suitable electronic communication protocol or an API for receiving reported threat notifications, which it transmits to the safety hatch controller 110 via one or more data networks.

As illustrated in FIG. 1, the cloud computing environment 102, the first on-premise network controller 104, the second on-premise network controller 106, the third on-premise network controller 108, the safety hatch controller 110, the first wireless network 118, the second wireless network 120, the third wireless network 122, and other illustrated components are communicatively coupled via a data network 134. The data network 134 may be implemented using wide area networks (for example, the Internet), local area networks (for example, an Ethernet or Wi-Fi™ network), cellular data networks, and combinations or derivatives thereof. The data network 134 includes a plurality of network devices 136 (for example, routers, switches, or combination devices), which control connections to and traffic flow on the data network 134. The network devices 136 forward network traffic to and from the illustrated components as described herein. The network devices 136 may forward network traffic via Layer 2 switching, Layer 3 routing, or a combination of both. As described more particularly herein, the network devices 136 are configured to, among other things, enable and disable data network communications between the first wireless network 118, the second wireless network 120, and the third wireless network 122 and their respective remote and on-premise network controllers.

FIG. 2 schematically illustrates one embodiment of the safety hatch controller 110. In the example illustrated, the safety hatch controller 110 includes an electronic processor 210, a memory 220, a transceiver 230, and an input/output interface 240. The electronic processor 210, the memory 220, the transceiver 230, and the input/output interface 240 communicate over one or more control and/or data buses (for example, a communication bus 250). In some embodiments, the safety hatch controller 110 is a computer server. FIG. 2 illustrates only one example embodiment of a safety hatch controller 110. The safety hatch controller 110 may include fewer or additional components and may perform functions other than those explicitly described herein.

In some embodiments, the electronic processor 210 is implemented as a microprocessor with separate memory, such as the memory 220. In other embodiments, the electronic processor 210 may be implemented as a microcontroller (with memory 220 on the same chip). In other embodiments, the electronic processor 210 may be implemented using multiple processors. In addition, the electronic processor 210 may be implemented partially or entirely as, for example, a field-programmable gate array (FPGA), and application specific integrated circuit (ASIC), and the like and the memory 220 may not be needed or be modified accordingly. In the example illustrated, the memory 220 includes non-transitory, computer-readable memory that stores instructions that are received and executed by the electronic processor 210 to carry out functionality of the safety hatch controller 110 described herein. The memory 220 may include, for example, a program storage area and a data storage area. The program storage area and the data storage area may include combinations of different types of memory, such as read-only memory and random-access memory. In the embodiment illustrated, the memory 220 stores, among other things, threat and threat mitigation data 235 (for example, threat detection messages, threat ratings, and threat mitigation strategies (see FIG. 4).

The transceiver 230 enables wired communication, wireless communication, or both from the safety hatch controller 110 to other components of the system 100.

The input/output interface 240 may include one or more input mechanisms (for example, a touch screen, a keypad, a button, a knob, and the like), one or more output mechanisms (for example, a display, a printer, a speaker, and the like), or a combination thereof. The input/output interface 240 receives input from input devices actuated by a user, and provides output to output devices with which the user interacts. In some embodiments, as an alternative or in addition to managing inputs and outputs through the input/output interface 240, the safety hatch controller 110 may receive user input, provide user output, or both by communicating with an external device, such as a console computer, over a wired or wireless connection.

In some embodiments, one or more of the first remote network controller 112, the second remote network controller 114, the third remote network controller 116, the first on-premise network controller 104, the second on-premise network controller 106, and the third on-premise network controller 108, although having distinct functions and capabilities, include a similar general component configuration as the safety hatch controller 110, in that they each include a respective electronic processor, memory, transceiver, and input/output interface coupled by a communication bus.

Figure 3:
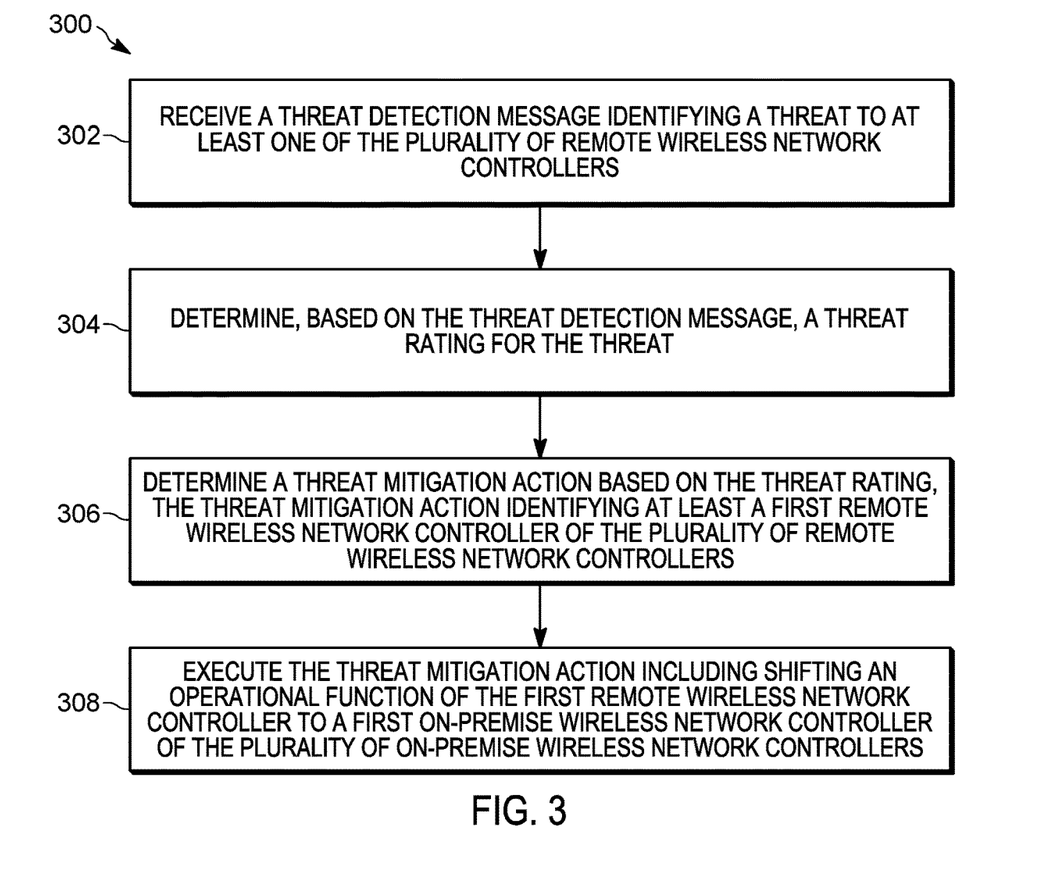
FIG. 3 is a flowchart illustrating a method for operating the safety hatch controller of FIG. 2 in accordance with some embodiments.

FIG. 3 illustrates an example method 300 for mitigating threats to a plurality of wireless communication networks. Although the method 300 is described in conjunction with the system 100 as described herein, the method 300 could be used with other systems and devices. In addition, the method 300 may be modified or performed differently than the specific example provided.

As an example, the method 300 is described as being performed by the safety hatch controller 110 and, in particular, the electronic processor 210. In some embodiments, the electronic processor 210 includes multiple electronic processors included in the safety hatch controller 110 that perform all or a portion of the method 300. Further, in some embodiments, the safety hatch controller 110 is a distributed controller in which processors of multiple devices cooperate to form the safety hatch controller 110 and perform its functionality.

At block 302, the electronic processor 210 receives (for example, via the transceiver 230), a threat detection message. For example, the electronic processor 210 may receive the threat detection message (for example, using a suitable electronic communication protocol or an API) from the rules-based threat detector 130. In another example, the electronic processor 210 may receive the threat detection message from the manual threat detection system 132. The threat detection message is an electronic message identifying a threat to at least one of the remote wireless network controllers 112, 114, 116. For example, the threat detection message may indicate that a denial of service attack has been detected, that an account has been compromised, or another of the previously described threats is present. The initial detection of the threat by the rules-based threat detector 130 or the manual threat detection system 132 is described in further detail above.

At block 304, the electronic processor 210 determines, based on the threat detection message, a threat rating for the threat. In some embodiments, the threat rating includes more than one component, for example, a threat severity rating for the threat, a threat scope rating for the threat, and a threat confidence rating for the threat. In some embodiments, the electronic processor 210 may assign weights to the components when compiling the threat rating.

The electronic processor 210 determines the threat severity rating based on the type of threat identified in the threat detection message. For example, in some embodiments, the memory 220 may store a lookup table that maps threat types to threat severity ratings and that is accessed by the electronic processor 210 to enable the electronic processor 210 to determine the threat severity rating for a threat. In some embodiments, the threat severity rating is a numerical value (for example, a decimal number, an integer, or a percentile) that indicates how serious the threat is. For example, the higher the threat rating, the greater the potential impact. For example, a high rate DoS attack may be assigned a higher severity rating than a low rate DoS attack. Similarly, a compromised super user account may be assigned a high severity rating, while a user authorization failure may be assigned a lower severity rating. In some embodiments the threat severity rating may be expressed as a range (for example, low, medium, or high).

The electronic processor 210 determines the threat scope rating based on the remote wireless network controllers identified in the threat detection message. The threat scope rating for the threat is an indication of the number of remote network controllers impacted by the threat. The threat scope rating may be expressed as a percentage or remote network controllers, and absolute number of remote network controllers, or as a range (for example, low, medium, or high).

The electronic processor 210 determines the threat confidence rating based on the threat detection message. For example, the threat detection message may include an indication of how the threat was detected (automatically or manually). In some embodiments, the threat confidence is a numerical representation (for example, from 0 to 1) of how likely it is that the detected threat is an actual threat. For example, a threat reported by a network operator may be assigned a high confidence level. In another example, a threat detected by the rules-based threat detector 130 for the first time may be assigned a low confidence value, while an automatically detected threat type that has been validated in the past would be assigned a higher confidence value. In some embodiments the threat confidence may be expressed as a range (for example, low, medium, or high).

In some embodiments, the electronic processor 210 compares the threat severity rating, the threat scope rating, and the threat confidence rating to a minimum threshold to respective thresholds. When each of the ratings fails to exceed its respective threshold, the electronic processor 210 transmits a false threat message to the rules-based threat detector 130. For example, when ranges (low, medium, and high) are used to express the ratings, the electronic processor 210 may determine that the threat detection is false (or not significant enough to act on) when none of the ratings exceeds "low."

Figure 4:
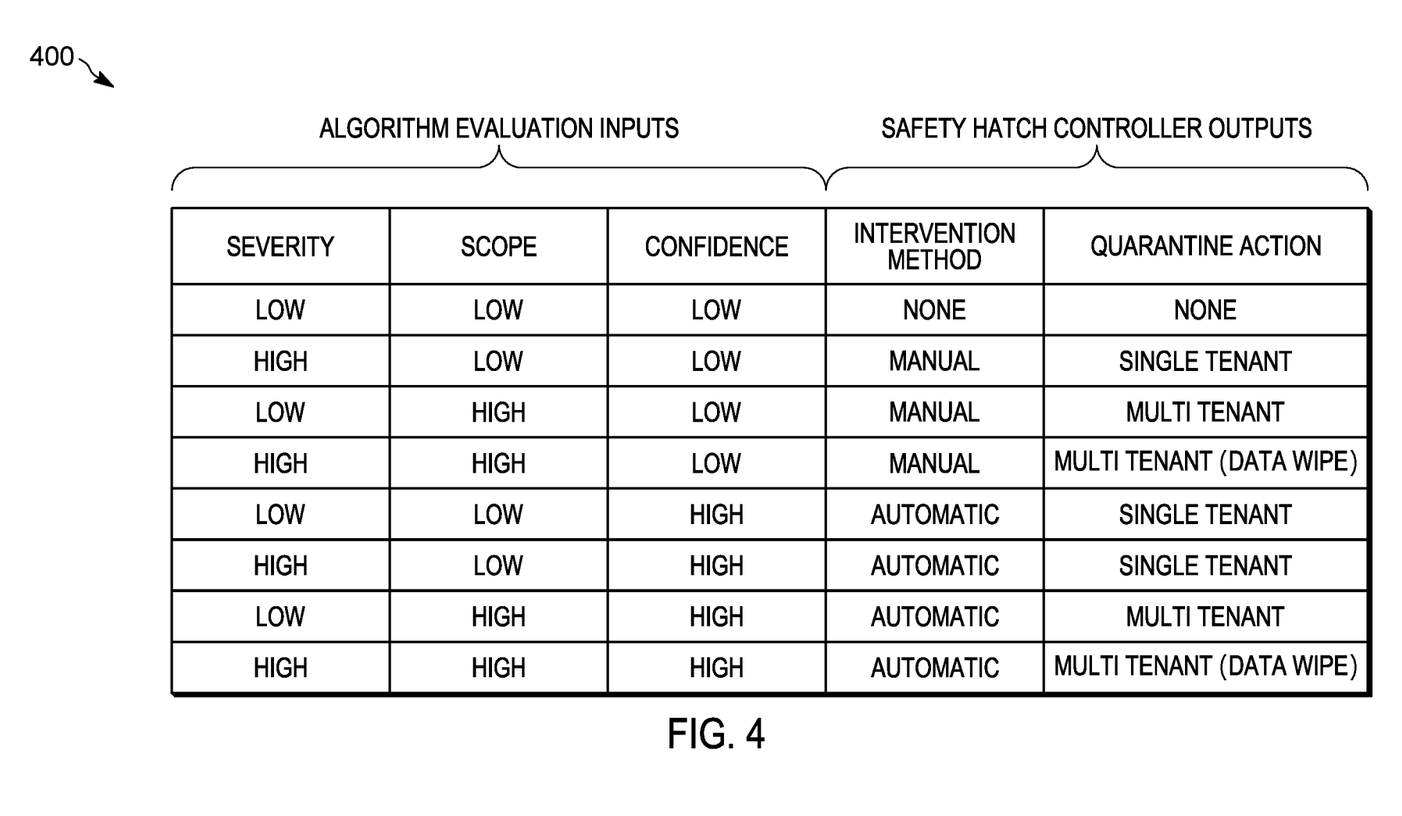
FIG. 4 is a chart illustrating aspects of the operation of the system of FIG. 1 in accordance with some embodiments.

At block 306, the electronic processor 210 determines a threat mitigation action based on the threat rating. The threat mitigation action identifies one or more remote wireless network controllers. FIG. 4 includes a chart 400, illustrating some example threat mitigation actions based on threat ratings. The chart 400 may be stored in the memory 220 as a lookup table (for example, as part of the threat and threat mitigation data 235), accessible by the electronic processor 210, that receives the threat rating (e.g., the threat severity rating, the threat scope rating, and the threat confidence rating) as an input, and provides a threat mitigation action as an output. The threat mitigation actions are identified as "Safety Hatch Controller Outputs" and include an intervention method (automatic or with a manual approval condition) and a quarantine action (which network control will be transferred). For example, where a threat rating indicates a threat severity rating of "Low," a threat scope rating of "High," and a threat confidence rating of "High," the threat mitigation action includes transferring control of multiple tenants to their respective on-premise network controllers automatically (that is, without manual intervention). In another example, where a threat rating indicates a threat severity rating of "Low", a threat scope rating of "High," and a threat confidence rating of "Low," the threat mitigation action includes transferring control of multiple tenants to their respective on-premise network controllers after acquiring manual approval of the proposed mitigation action. For example, the electronic processor 210 may send an electronic request to a network operations center (for example, by automatically opening a help desk ticket with a high priority or presenting an alert on a display of a network operator's console) and receive an electronic acknowledgement and approval of the mitigation action from the network operations center.

Returning to FIG. 3, at block 308, the electronic processor 210 executes the threat mitigation action (determined at block 306). The threat mitigation action includes shifting an operational function from one or more remote wireless network controllers to the corresponding on-premise wireless network controllers. For example, the electronic processor 210 may shift the operational function of a remote wireless network controller to the corresponding on-premise wireless network controller by transmitting a command to a network device 136 associated with the wireless communication network controlled by the remote wireless network controller. The command is an electronic message instructing the network device 136 to disconnect its associated wireless communication network from the wireless communication network's associated remote wireless network controller. This will, for example, result in the wireless communication network failing over to the on-premise network controller. In some embodiments, the mitigation action includes instructing the remote network controller to synchronize its operational data to the corresponding on-premise network controller before issuing the command to the network device.

In some embodiments, as illustrated in FIG. 4, a "data wipe" is performed in addition to a transfer of control. For example, where a threat rating indicates a threat severity rating of "High", a threat scope rating of "High," and a threat confidence rating of "High," the threat mitigation action includes transferring control of multiple tenants to their respective on-premise network controllers automatically, and wiping the data from the remote network controllers. In such embodiments, the electronic processor 210 executes the threat mitigation action by transmitting a command to affected remote wireless network controllers to delete their operational data. This prevents the data from being exfiltrated or otherwise compromised.

In some embodiments, as illustrated in FIG. 4, in response to the threat severity rating being a low severity level, the electronic processor 210 requests a manual approval for the threat mitigation action before executing the threat mitigation action.

In some embodiments, the safety hatch controller 110 continually monitors the cloud computing environment 102 for threat recovery (for example, by determining that usage or other levels no longer deviate from those predicted by the model). In such embodiments, when the electronic processor 210 determines automatically that the threat has subsided, or receives a recovery indication for the affected remote wireless network controllers, it transmits to the relevant data network devices, a command to connect their associated wireless communication networks to their associated remote wireless network controllers. The electronic processor 210 also transmits a command to the relevant on-premise wireless network controllers to synchronize their operational data to their associated remote wireless network controllers. For example, each on-premise wireless network controller may transmit its operational data, which describes the current state of the wireless network, to its associated remote wireless network controller. In some embodiments, to avoid thrashing, the electronic processor 210 will only initiate recovery when the affected remote network controllers have been free from threat indications for a predetermined period.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

It should also be understood that although certain examples depict components as logically separate, such depiction is merely for illustrative purposes. In some embodiments, the illustrated components may be combined or divided into separate software, firmware and/or hardware. Regardless of how they are combined or divided, these components may be executed on the same computing device or may be distributed among different computing devices connected by one or more networks or other suitable communication means.

In addition, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A wireless communication system comprising:
a safety hatch controller including a transceiver and an electronic processor;
wherein the safety hatch controller is communicatively coupled to:
a plurality of remote wireless network controllers, each of the plurality of remote wireless network controllers associated with one of a plurality of wireless communication networks, and
a plurality of on-premise wireless network controllers, each of the plurality of on-premise wireless network controllers associated with one of the plurality of wireless communication networks; and
wherein the electronic processor is configured to:
receive, via the transceiver, a threat detection message identifying a threat to at least one of the plurality of remote wireless network controllers;
determine, based on the threat detection message, a threat rating for the threat;
determine a threat mitigation action based on the threat rating, the threat mitigation action identifying at least a first remote wireless network controller of the plurality of remote wireless network controllers; and
execute the threat mitigation action,
wherein the threat mitigation action includes shifting an operational function of the first remote wireless network controller to a first on-premise wireless network controller of the plurality of on-premise wireless network controllers, and
wherein the first remote wireless network controller and the first on-premise wireless network controller are each associated with the same wireless communication network of the plurality of wireless communication networks.

2. The wireless communication system of claim 1, wherein the threat rating includes a threat severity rating for the threat, a threat scope rating for the threat, and a threat confidence rating for the threat, and to determine the threat rating, the electronic processor is configured to:
determine, based on the threat detection message, the threat severity rating for the threat;
determine, based on the at least one of the plurality of remote wireless network controllers identified in the threat detection message, the threat scope rating for the threat; and
determine, based on the threat detection message, the threat confidence rating for the threat.

3. The wireless communication system of claim 2, wherein the electronic processor is further configured to
determine that the threat confidence rating for the threat is low confidence, and
in response to the threat confidence rating being low confidence, request a manual approval for the threat mitigation action before executing the threat mitigation action,
wherein the execution of the threat mitigation action is in response to receipt of the manual approval.

4. The wireless communication system of claim 1, wherein
the safety hatch controller is communicatively coupled to a plurality of data network devices, each of the plurality of data network devices associated with one of the plurality of wireless communication networks, and
the electronic processor is configured to shift the operational function of the first remote wireless network controller to the first on-premise wireless network controller of the plurality of on-premise wireless network controllers by transmitting, via the transceiver, to a first data network device of the plurality of data network devices associated with the wireless communication network of the plurality of wireless communication networks associated with the first remote wireless network controller, a command to disconnect its associated wireless communication network from the wireless communication network's associated remote wireless network controller.

5. The wireless communication system of claim 4, wherein
each of the plurality of remote wireless network controllers includes a memory storing operational data for its associated wireless communication network, and the electronic processor is configured to:

receive, via the transceiver, a recovery indication for a subset of the plurality of remote wireless network controllers; and responsive to receiving the recovery indication, transmit, via the transceiver, to the first data network device, a command to connect its associated wireless communication network to the wireless communication network's associated remote wireless network controller, and transmit, via the transceiver, to the first on-premise wireless network controller, a command to synchronize the operational data for its associated wireless communication network to its associated remote wireless network controller.

6. The wireless communication system of claim 1, wherein each of the plurality of remote wireless network controllers includes a memory storing operational data for its associated wireless communication network, and the electronic processor is configured to execute the threat mitigation action by transmitting, via the transceiver, a command to the first remote wireless network controller to delete its operational data.

7. The wireless communication system of claim 6, wherein the operational data includes at least one selected from the group consisting of mobility information, provisioning data, current active call data, system performance data, system fault data, and active integrated voice and data session data.

8. The wireless communication system of claim 1, wherein the electronic processor is configured to receive the threat detection message from an automated threat detection engine.

9. The wireless communication system of claim 2, wherein the electronic processor is configured to, responsive to determining that each of the threat severity rating, the threat scope rating, and the threat confidence rating fail to exceed a threshold, transmit, via the transceiver, a false threat message to an automated threat detection engine.

10. The wireless communication system of claim 1, wherein the threat to at least one of the plurality of remote wireless network controllers includes at least one selected from the group consisting of a denial of service attack, a compromised account, a vulnerability attack, a theft of service, a brute force attack, an authentication failure count, a feature access, a user detail load failure, an application startup, an application shutdown, and an unauthorized user.

11. A method for mitigating threats to a plurality of wireless communication networks, the method comprising:

receiving, with an electronic processor, a threat detection message identifying a threat to at least one of a plurality of remote wireless network controllers, each of the plurality of remote wireless network controllers associated with one of the plurality of wireless communication networks;

determining, with the electronic processor, based on the threat detection message, a threat rating for the threat;

determining a threat mitigation action based on the threat rating, the threat mitigation action identifying at least a first remote wireless network controller of the plurality of remote wireless network controllers; and executing, with the electronic processor, the threat mitigation action, wherein the threat mitigation action includes commanding a shift in an operational function of the first remote wireless network controller to a first on-premise wireless network controller of a plurality of on-premise wireless network controllers, each of the plurality of on-premise wireless network controllers associated with one of the plurality of wireless communication networks, wherein the first remote wireless network controller and the first on-premise wireless network controller are each associated with the same wireless communication network of the plurality of wireless communication networks.

12. The method of claim 11, wherein determining the threat rating includes:

determining, based on the threat detection message, a threat severity rating for the threat;

determining, based on the at least one of the plurality of remote wireless network controllers identified in the threat detection message, a threat scope rating for the threat; and determining, based on the threat detection message, a threat confidence rating for the threat.

13. The method of claim 12, further comprising:

determining that the threat confidence rating for the threat is low confidence, and in response to the threat confidence rating being low confidence, requesting a manual approval for the threat mitigation action before executing the threat mitigation action, wherein the execution of the threat mitigation action is in response to receipt of the manual approval.

14. The method of claim 11, wherein commanding a shift in the operational function of the first remote wireless network controller to the first on-premise wireless network controller of the plurality of on-premise wireless network controllers includes transmitting, via a transceiver, to a first data network device of a plurality of data network devices associated with the wireless communication network of the plurality of wireless communication networks associated with the first remote wireless network controller, a command to disconnect its associated wireless communication network from the wireless communication network's associated remote wireless network controller.

15. The method of claim 14, further comprising:

receiving, via the transceiver, a recovery indication for a subset of the plurality of remote wireless network controllers; and responsive to receiving the recovery indication, transmitting, via the transceiver, to the first data network device, a command to connect its associated wireless communication network to the wireless communication network's associated remote wireless network controller, and transmitting, via the transceiver, to the first on-premise wireless network controller, a command to synchronize the operational data for its associated wireless communication network to its associated remote wireless network controller.

16. The method of claim 11, further comprising:

executing the threat mitigation action by transmitting, via the transceiver, a command to the first remote wireless network controller to delete its operational data.

17. The method of claim 16, wherein the operational data includes at least one selected from the group consisting of mobility information, provisioning data, current active call data, system performance data, system fault data, and active integrated voice and data session data.

18. The method of claim 11, further comprising:

receiving the threat detection message from an automated threat detection engine.

19. The method of claim 12, further comprising:
responsive to determining that each of the threat severity rating, the threat scope rating, and the threat confidence rating fail to exceed a threshold, transmitting, via the transceiver, a false threat message to an automated threat detection engine.

20. The method of claim 11, wherein the threat to at least one of the plurality of remote wireless network controllers includes at least one selected from the group consisting of a denial of service attack, a compromised account, a vulnerability attack, a theft of service, a brute force attack, an authentication failure count, a feature access, a user detail load failure, an application startup, an application shutdown, and an unauthorized user.

* * * * *